United States Patent [19]

Herb et al.

[11] 4,275,637

[45] Jun. 30, 1981

[54] FASTENING ELEMENT ASSEMBLY

[75] Inventors: Armin Herb, Peissenberg; Gusztav Lang, Munich, both of Fed. Rep. of Germany

[73] Assignee: Hilti Aktiengesellschaft, Schaan, Liechtenstein

[21] Appl. No.: 53,953

[22] Filed: Jul. 2, 1979

[30] Foreign Application Priority Data

Jul. 3, 1978 [DE] Fed. Rep. of Germany ....... 2829158

[51] Int. Cl.³ .......................................... F16B 13/04
[52] U.S. Cl. ...................................... 411/78; 411/79; 411/72
[58] Field of Search ................... 85/79, 72, 87, 86, 88, 85/63, 61, 38, 31, 26, 11

[56] References Cited

U.S. PATENT DOCUMENTS

| 545,961 | 9/1895 | Lemmon | 85/79 X |
|---|---|---|---|
| 1,400,248 | 12/1921 | Thomas | 85/38 X |
| 1,993,749 | 3/1935 | Pleister | 85/79 |
| 2,362,969 | 11/1944 | Boelter | 85/79 |
| 2,498,627 | 2/1950 | Hallock | 85/26 X |
| 2,748,594 | 6/1956 | Edwards | 85/79 |
| 2,771,746 | 11/1956 | Fischer et al. | 85/79 |
| 2,903,938 | 9/1959 | Strand | 85/79 |
| 3,216,306 | 11/1965 | Taylor | 85/79 |
| 3,333,499 | 8/1967 | Rudd | 85/26 |
| 3,427,919 | 2/1969 | Lerich | 85/79 X |
| 3,518,915 | 7/1970 | Gutshall | 85/79 X |
| 3,680,430 | 8/1972 | Cannon et al. | 85/79 |

FOREIGN PATENT DOCUMENTS

| 536310 | 1/1957 | Canada | 85/79 |
|---|---|---|---|
| 1529494 | 10/1978 | United Kingdom | 85/79 |

*Primary Examiner*—Ramon S. Britts

[57] ABSTRACT

A fastening element assembly for insertion into a prepared borehole is made up of a tie bolt and an expanding wedge. The tie bolt has a C-shaped flange formed on its trailing end which projects radially and circumferentially from the tie bolt. The projecting ends of the flange form a guide for the expanding wedge as the wedge is driven into a borehole in converting the assembly from its unspread condition into locked engagement within the borehole. Preferably, the circumferential surface of the tie bolt and the expanding wedge each form part of a circle. In the unspread condition, the circumferential surfaces of the parts of the tie bolt and expanding wedge disposed in surface contact with one another, form a circle.

11 Claims, 7 Drawing Figures

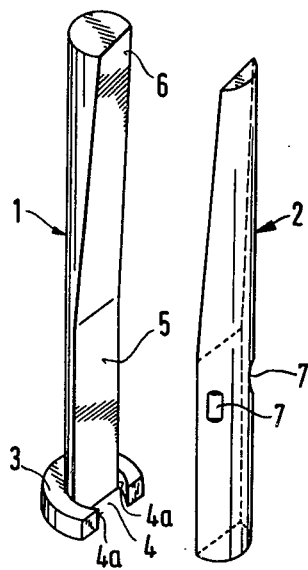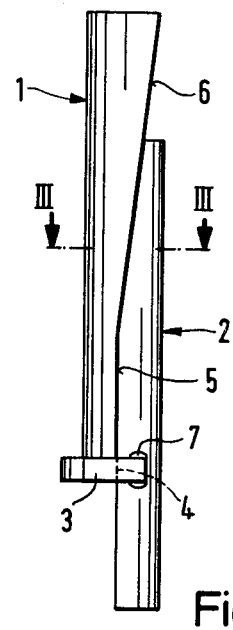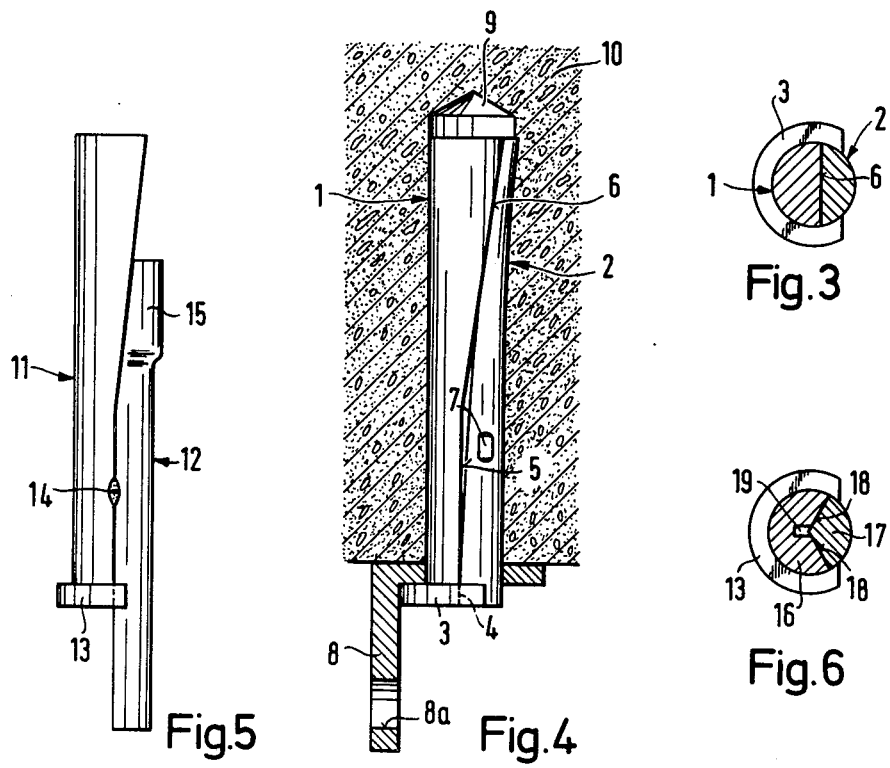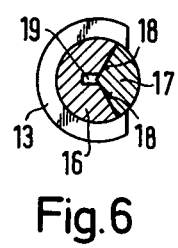

FASTENING ELEMENT ASSEMBLY

SUMMARY OF THE INVENTION

The present invention is directed to a fastening element assembly made up of a tie bolt and an expanding wedge. A flange is provided on the trailing end of the tie bolt and the flange provides a pair of spaced ends which form guides for the expanding wedge when it is driven relative to the tie bolt into a prepared borehole. The forward part of the tie bolt includes a wedge surface and the transverse cross-sectional area of this forward portion increases to the leading end of the tie bolt. In the unspread condition, the expanding wedge extends axially from the trailing end of the tie bolt. Further, parts of the tie bolts and expanding wedge are in surface contact when the fastening element assembly is in the unspread condition and the circumferential surfaces of the contacting parts are symmetrical about the axis of the fastening element assembly.

Fastening elements of the type employed for effecting anchoring in a borehole, are used for a variety of purposes, particularly for hanging ceilings, panelling, scaffolding, pipes, cables and the like. A number of such fastening elements are known. Since such fastening elements are used in great numbers they must be capable of production at low cost and also must be quickly insertable into boreholes without requiring any special measures. For safety reasons, a certain after spreading of the fastening elements is required once the load has been applied to them.

Most of the elements used for the above-listed purposes employ the wedge expanding principle. One part of the element is designed as a tie bolt and a wedge-shaped expanding element is combined with the tie bolt and is displaceable relative to it for effecting the desired expanding action. These known fastening elements are such that, after a certain preliminary spreading has been achieved, the element is firmly seated within a receiving borehole, such as in a ceiling, and a subsequent after-spreading is accomplished by attaching a load to the tie bolt whereby a further wedging effect is obtained.

In a known fastening element, a compression spring is provided on the tie bolt and the spring can be tensioned by a locking part. This known element is also provided with an expanding wedge part which can be displaced relative to the tie bolt and is arranged so that, after the locking part is loosened, the relaxed spring displaces the wedge part causing a preliminary spreading when the element is inserted into a receiving bore in a ceiling. This element has a further advantage over other known elements in that a sufficient preliminary spreading action can be achieved. There are considerable disadvantages to this particular fastening element, for instance, the arrangement of the element is so elaborate that its cost is high, particularly for mass production. Moreover, there is the danger that the locking part may become loose before the fastening element is introduced into a receiving borehole causing the expanding wedge to move prematurely into its preliminary spreading position relative to the tie bolt. Such premature movement may cause considerable injury to the operator. In addition, retightening and repositioning the locking part cannot be effected without additional tools and special technical knowledge.

Another simple fastening element also consists of a tie bolt and an expanding wedge which parts complement one another forming a circular cross-section in the unspread condition of the element. For attaching a load, the tie bolt has a male thread and a hexagonal nut. Compared to the above-mentioned fastening element which is prestressed by spring force, this particular element has certain constructional advantages, for instance, it is difficult to displace the expanding wedge for effecting preliminary spreading, because the tie bolt extends axially from the trailing end of the expanding wedge. As a result, as viewed in the axial direction, the expanding wedge is covered by the projection of the hexagonal nut which secures the load to the tie bolt. This type of fastening element is not suited for use where a load is hung from it, rather it is useful when a part can be braced between the hexagonal nut and the trailing end of the expanding wedge so that an adequate preliminary spreading is effected by tightening the hexagaonl nut.

Therefore, the primary object of the present invention is to provide a fastening element assembly which is especially suitable for hanging a load and one which is producible at low costs and can be placed without requiring additional tools and, moreover, which ensures sufficient preliminary spreading and after-spreading.

In accordance with the present invention, a fastening element assembly is provided made up of a tie bolt and an expanding wedge with a flange provided on the trailing end of the tie bolt and forming a guide for the expanding wedge as it is displaced relative to the tie bolt in effecting the anchoring action of the assembly in a prepared borehole. In the unspread condition of the fastening element assembly, the trailing end of the expanding wedge extends outwardly from the trailing end of the tie bolt at which the flange is located. Further, in the unspread condition, the circumferential surfaces of the portions of the tie bolt and the expanding wedge disposed in contact with one another form a circular cross-section.

The fastening element assembly of the present invention is characterized in particular by an extremely simple design. Moreover, the placement of the assembly into locked engagement in a borehole is especially simple since the entire element, consisting only of the tie bolt and the expanding wedge, is introduced into the borehole until the flange on the trailing end of the tie bolt contacts the surface, for instance a ceiling, in which the borehole is formed. When the assembly is in this position, the expanding wedge is driven in by a number of hammer blows until its trailing end is displaced relative to the tie bolt until the trailing ends of each of the tie bolt and the expanding wedge are flush with one another. In this position, the trailing end of the expanding wedge is flush with the outwardly facing surface of the flange. When the trailing ends of the two parts of the assembly are in a flush position it indicates that the assembly has attained a sufficient preliminary spreading action. Since the contacting parts of the assembly in the unspread condition afford a circular cross-section, the receiving borehole and the fastening element assembly can be adapted with respect to one another so that a high degree of anchoring is attained in the preliminary spreading step. Furthermore, it is possible to keep the clearance between the fastening element assembly and the surface within the receiving borehole extremely small, so that a large contact area is provided between the surface of the borehole and the fastening element assembly in the spread or anchored condition.

When a load is attached to the tie bolt acting against the flange, it tends to cause an after-spreading action.

Accordingly, it is possible to provide hooks, eyes and similar parts directly on the flange or to position receiving parts, such as supporting angles, between the flange and the surface, such as a ceiling, into which the borehole is formed.

To simplify assembly and storekeeping, it is advantageous if the expanding wedge is detachably connected to the tie bolt in the unspread condition. Accordingly, the parts forming the fastening element constitute a unit before they are introduced into the receiving borehole. Moreover, setting the fastening element assembly in the borehole is facilitated, since the element can be introduced into the borehole by light hammer blows on the outwardly projecting trailing end of the expanding wedge. When the expanding wedge has been driven into the borehole so that the flange rests against the ceiling or against an interposed part between it and the ceiling, the detachable connection between the two parts of the assembly is broken when additional hammer blows are applied, accordingly, the expanding wedge is then displaced axially relative to the tie bolt and the desired spreading or anchoring effect is attained.

The detachable connection between the two parts of the fastening element asembly can be established in various ways. In one embodiment of the invention, the two parts are connected together by a locking means. The ends of the C-shaped flange located at the trailing end of the tie bolt affords a suitable locking means which engage within corresponding depressions or recesses in the circumferential surface of the expanding wedge. Disengagement of this type of connection is effected by displacing the expanding wedge relative to the tie bolt and, therefore, displacing the depressions out of the range of the ends of the flange. Other possible connections include weldments or adhesive joints between the two parts of the assembly. In such detachable connections, the weldment or adhesive joint is sheared in a known manner by applying force to the expanding wedge.

Preferably, an axially extending portion of the expanding wedge at its leading end is provided with an increased transverse cross-section. Since this is the end which extends for the greatest depth into the borehole, the highest spreading forces are achieved in this inner region. Moreover, spalling on the surface of the ceiling would be avoided. A similar effect can be achieved, for example, if teeth are provided on the leading end portion of the expanding wedge so that outer ends of the teeth project beyond the circumferential surface of the expanding wedge. Such a toothed arrangement has the further advantage that any slippage of the expanding wedge can be prevented, accordingly, an effective after-spreading is assured.

In another feature of the invention, the wedge-shaped part of the tie bolt can be formed by two axially extending surfaces arranged to form an obtuse angle. The corresponding wedge-shaped surface of the expanding wedge has a complementary shape. It is immaterial whether the tie bolt or the expanding wedge form the concave wedging surface. With the wedging surfaces in this configuration, the part having the concave shape also widens radially, accordingly, the bearing area on the surface of the borehole is increased under spreading conditions with a resultant increase in the anchoring values. To improve the radial deformability of the concave-shaped part, a weakened area can be provided such as in the form of an oblong slot cut into the apex region of the concave surface. By providing a concave or convex configuration to the wedging surfaces on the expanding wedge increases its rigidity against buckling when the expanding wedge is driven into a borehole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a perspective view of one embodiment of the fastening element assembly incorporating the present invention with the tie bolt and the expanding wedge separated from one another;

FIG. 2 is a side view of the fastening element assembly shown in FIG. 1 with the assembly ready to be inserted into a borehole;

FIG. 3 is a sectional view taken along the line III—III in FIG. 2;

FIG. 4 is a side view, partly in section, of the fastening element shown in FIGS. 1–3 driven into an anchored position within a receiving material;

FIG. 5 is a side view of a fastening element assembly illustrating another embodiment of the invention;

FIG. 6 is a cross-sectional view similar to that shown in FIG. 3 of another embodiment of a fastening element assembly in accordance with the present invention.

DETAIL DESCRIPTION OF THE INVENTION

Figure 7:
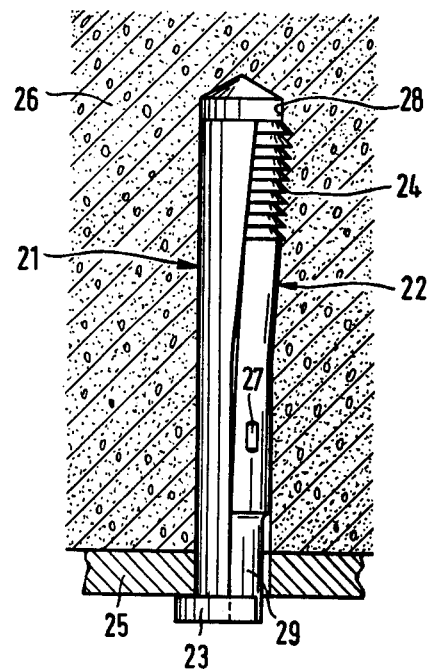
FIG. 7 is a side view, similar to FIG. 4, illustrating another embodiment of a fastening element assembly incorporating the present invention with the assembly driven into a final set position.

As can be seen from FIGS. 1 and 2, the fastening element assembly embodying the present invention is made up of a tie bolt 1 and an expanding wedge 2. Each of the tie bolt 1 and expanding wedge 2 has a leading end and a trailing end, the leading end is the one inserted first into a borehole. In FIG. 4 it can be noted that the leading end of the tie bolt and the expanding wedge is inserted for almost the full depth of the borehole 9 formed in a ceiling 10. The trailing end of both parts is located adjacent the surface of the ceiling 10 when the fastening element is fully inserted. At its trailing or second end, the tie bolt 1 has a C-shaped flange 3 extending around the full extent of its circumferential surface. Because of its C-shaped configuration the flange in combination with the end portion of the surface 5 of the tie bolt forms a recess 4. As can be seen in FIG. 2, the recess 4 serves as a guide for the expanding wedge 2 while the wedge is displaced axially relative to the tie bolt into the position shown in FIG. 4. From the trailing or second end to the leading or first end, the tie bolt is provided with a circular shaped circumferential surface and an interior surface which faces toward the corresponding surface on the expanding wedge 2. The interior surface of the tie bolt has a planar surface 5 which extends diametrically or chordally relative to the axis of the fastening element assembly. The surface 5 extends from the second end to approximately midway between the first and second ends of the tie bolt and then changes over into a wedge-shaped surface 6 with the surface oriented relative to the axis of the fastening element assembly so that the transverse cross-sectional area of the tie bolt increases from the planar surface 5 to the leading or first end of the tie bolt. At the leading edge or first end, the tie bolt has a circumferential surface which forms almost a complete circle, accordingly the wedge surface 6 is inclined from an intermediate portion of the tie bolt where it forms approximately half of the full cross-section of the fastening element assembly and the leading end of the tie bolt where it forms almost the full circular portion. The expanding wedge 2 has a planar surface corresponding to the planar surface 5 on the tie bolt 1. This planar surface extends for approximately half of the axial length of the expanding wedge 2 and then for the rest of the axial length of the wedge a sloping wedge surface is provided complementary to the wedge surface 6 on the tie bolt. As can be seen best in FIGS. 2 and 3, with the fastening element assembly in the unspread condition, a part of the tie bolt 1 extending from its trailing end toward the leading end and a part of the expanding wedge 2 extending from its leading end toward the trailing end are in contact and the circumferential surfaces of the two contacting portions form a complete circular cross-section, note FIG. 3.

As indicated, FIG. 2 shows the fastening element assembly in the unspread condition, that is assembled but not yet inserted into a borehole. In other words, the expanding wedge 2 has not been displaced axially relative to the tie bolt 1. When assembled prior to use, the expanding wedge 2 has a pair of oppositely arranged depressions 7 into which the edges 4a of the ends of the flange 3 fit. The sides of the flange projecting circumferentially outwardly from the trailing end of the tie bolt provide the sides of the recess 4 and it is there sides which fit into the depressions 7.

In FIG. 4 the fastening element assembly of FIGS. 1-3 is shown in the fully inserted condition and a supporting angle 8 is shown fitted onto the tie bolt and expanding wedge so that it seats between the flange 3 and the surface of the ceiling 10. The fastening element assembly, in its preassembled state, as shown in FIG. 2, has been introduced into the borehole 9 in the ceiling 10 with the angle 8 positioned on the assembly. In placing the fastening element assembly into its final position, after it is first placed in the borehole, a number of hammer blows are applied to the expanding wedge 2 while the assembly remains in the upspread condition. In other words, initially the assembly is arranged as shown in FIG. 2 so that the expanding wedge 2 extends axially rearwardly from the trailing end of the tie bolt 1. As soon as the flange 3 with the interposition of of the supporting angle 8, contacts the surface of the ceiling 10, any additional hammer blows against the end of the expanding wedge causes an axial displacement of the wedge relative to the tie bolt so that the edges of the flange no longer seat within the depressions 7. Any further blows cause the expanding wedge 2 to be driven deeper into the borehole along the surfaces 5 and 6 on the tie bolt. When the trailing or second end of the expanding wedge 2 is finally flush with the outwardly facing surface of the flange 3 a visual indication is afforded that sufficient preliminary spreading of the assembly has been achieved. When a load is applied to the supporting angle at the opening 8a there is a tendency to withdraw the tie bolt 1 from the borehole relative to the expanding wedge 2, and accordingly, an after-spreading is effected.

In FIG. 5 another embodiment of the fastening element assembly of the present invention is illustrated made up of a tie bolt 11 and an expanding wedge 12. At its trailing end, the tie bolt 11 has a flange 13 extending circumferentially around its outer surface so that the combination of the opposite ends of the flange and the inner surface of the tie bolt form a recess, not shown, which serves as a guide for the expanding wedge 12. In assembling the tie bolt 11 and the expanding wedge 12 together, a weldment 14 is provided located on the inwardly facing surfaces of the two parts. This attachment, which can also be provided by an adhesive joint, is broken when the fastening element assembly is driven into the borehole. The weldment 14 has the similar effect as the locking joint provided by the interengagement of the edges of the flange 3 into the depressions 7 in the embodiment shown in FIGS. 1–4. In FIG. 5, at its leading end, the circumferential surface of the expanding wedge 12 has a widened portion 15. The widened portion 15 provides an increased cross-sectional area as compared to the leading end of the expanding wedge 2 shown in FIG. 1. The widened portion 15 assures that the greatest spreading or anchoring forces are developed at the inner end of the borehole. With the exception of these two features, the fastening element assembly in FIG. 5 is similar to that described in the previous embodiment.

In FIG. 6 a cross-sectional view is provided of another embodiment of a fastening element assembly consisting of a tie bolt 16 and an expanding wedge 17. In this embodiment, the wedge surface of tie bolt 16 is not planar, rather it is formed of two axially extending parts 18 each disposed at an obtuse angle to the other. In other words, the part surfaces 18 form a concave arrangement. The expanding wedge 17 has complementary shaped part surfaces which are convex so that they fit into the concave surface parts 18. When the expanding wedge 17 is displaced axially relative to the tie bolt 16, the tie bolt is widened radially because of the configuration of the surface parts 18. This radial widening can be facilitated by providing cross-sectional weakened parts, for example, in the form of an oblong slot 19 extending into the tie bolt from the point of intersection of the surface parts 18. It would also be possible to configure the surface parts 18 forming the wedge surface of the tie bolt so that the expanding wedge 17 widens radially. In such an arrangement, the widening action would be facilitated by providing weakened portions in the expanding wedge.

In FIG. 7 another fastening element assembly is shown embodying the present invention and the assembly is illustrated fully inserted into the ceiling 26 and securing a side bar 25 to the ceiling. The fastening element assembly consists of a tie bolt 21 and an expanding wedge 22. A flange 23 extends around the circumferential surface of the tie bolt 21 at its trailing end and holds the side bar 25 against the surface of the ceiling 26. As with the embodiments described above, this assembly has a recess formed by the ends of the flange 23 and the inner surface of the tie bolt for providing guidance for the expanding wedge 22 as it is driven axially relative to the tie bolt. Adjacent its leading or first end, the expanding wedge 22 has teeth 24. These teeth 24 serve to prevent any slippage or movement of the expanding wedge 22 out of the borehole. In a suitable arrangement, the individual teeth can be slightly resilient so that the overall arrangement compensates for dimensional tolerances in the diameter of the receiving bore 28 in the ceiling. The tooth arrangement 24 can also be provided as saw teeth or as a single projection. The parts of the fastening element assembly are interlocked in the manner described above with depressions 27 formed in the circumferential surface of the expanding wedge so that the ends of the flange 23 fit into the depressions holding the two parts of the assembly in the unspread condition. As can be seen in FIG. 7, the rear portion of the expanding wedge adjacent its trailing end has a reduced diameter section 29. This reduced diameter section prevents any jamming of the expanding wedge with the side bar 25 or with the tie bolt 21 so that the after-spreading effect of the fastening element assembly is not adversely affected. The fact that the expanding wedge is not guided in the region of the reduced diameter section 29 as it passed through the flange 23 is not considered important, since at that point the expanding wedge 22 has been sufficiently guided by the surface of the receiving borehole 28.

While specific embodiments of the invention have been shown and described in detail to illustrate the application of the inventive principles, it will be understood that the invention may be embodied otherwise without departing from such principles.

What is claimed is:

1. An axially elongated fastening element assembly for insertion into a prepared borehole having a transverse shape generally conforming to the transverse shape of said fastening element assembly, comprising a tie bolt and an expanding wedge each elongated in the axial direction of the fastening element, said tie bolt and expanding wedge each having a first end which is inserted first into the borehole and a trailing second end, each of said tie bolt and expanding wedge having a first axially extending surface forming a part of the exterior circumferential surface of the fastening element and a second axially extending surface located interiorly of the circumferential surface of the fastening element assembly and forming the contacting surfaces of said tie bolt and expanding wedge, said tie bolt and expanding wedge each having an axially extending wedging part extending from the first end thereof toward the second end and a second part extending from the trailing end of said wedging part to the second end thereof, the transverse cross-sectional area of said wedging part of said tie bolt increases in area toward the first end of said tie bolt and the transverse cross-sectional area of said wedging part of said expanding wedge decreases in area toward the first end of said expanding wedge, said tie bolt and expanding wedge having an upspread condition where the first end of said expanding wedge is located rearwardly of the first end of the tie bolt and in contact with the second surface of said tie bolt on the wedging part thereof, wherein the improvement comprises that a flange is formed on said tie bolt on the second end thereof with said flange extending circumferentially around and radially outwardly from the first surface of said tie bolt, said flange being approximately C-shaped in a plane extending transversely of the axial direction of the fastening element assembly, said C-shaped flange having a pair of ends each extending outwardly from said tie bolt in the circumferential direction of the first surface thereof at the second end of said tie bolt, in the unspread condition the second end of said expanding wedge is spaced axially outwardly from the second end of said tie bolt, the parts of said flange extending circumferentially outwardly from said tie bolt being in surface contact with the exterior circumferential surface of said wedging part and form guides for said expanding wedge as said expanding wedge is displaced axially inwardly into the borehole relative to said tie bolt, and in the unspread condition the first surfaces of said tie bolt and expanding wedge form a continuation of one another so that the first surfaces of the parts of said tie bolt and expanding wedge disposed in contact with one another in the unspread condition are symmetrical about the axis of the fastening element assembly.

2. Fastening element assembly, as set forth in claim 1, wherein the circumferentially extending first surfaces of said tie bolt and expanding wedge each form a portion of a circle having the same radius.

3. An axially elongated fastening element assembly, as set forth in claim 1, wherein said expanding wedge can be displaced axially relative to said tie bolt from the unspread condition at least for an axial distance until the second end of said expanding wedge is flush with the surface of said flange facing in the direction opposite to the first end of said tie bolt.

4. An axially elongated fastening element assembly, as set forth in claim 1, wherein in the unspread condition of said fastening element assembly, said expanding wedge is detachably connected to said tie bolt by at least said flange.

5. An axially elongated fastening element assembly, as set forth in claim 4, wherein depressions are formed in the first surface of said expanding wedge and the ends of said flange on said tie bolt extending circumferentially from said tie bolt seat into said depressions in said expanding wedge in the unspread condition of the fastening element assembly for effecting the detachable connection between said tie bolt and wedge.

6. An axially elongated fastening element assembly, as set forth in claim 4, wherein a weldment detachably secures said expanding wedge to said tie bolt.

7. An axially elongated fastening element assembly, as set forth in claim 4, wherein an adhesive material detachably connects said expanding wedge to said tie bolt.

8. An axially elongated fastening element assembly, as set forth in claim 1, wherein the axially extending portion of said expanding wedge extending from the first end thereof projects radially outwardly from the remaining first surface affording an increased cross-sectional area for the first end portion of said expanding wedge.

9. An axially elongated fastening element assembly, as set forth in claim 1, wherein at least one tooth is provided on the first surface of said expanding wedge at the first end thereof with said tooth extending in the circumferential direction around said first surface.

10. An axially elongated fastening element assembly, as set forth in claim 1, wherein the second surfaces on said wedging part of said tie bolt and expanding wedge comprising two axially extending surface parts with said surface parts extending at an obtuse angle relative to one another so that one of said tie bolts and expanding wedge has a concave shaped wedging surface and the other has a convex wedging surface formed complementary to one another.

11. An axially elongated fastening element assembly, as set forth in claim 10, wherein the one of said tie bolt and expanding wedge having the concave wedging surface has a weakened portion formed therein for facilitating radial widening thereof when said wedging surface is displaced axially relative to said tie bolt from the unspread condition with the first end of said expanding wedge moving toward the first end of said tie bolt.

* * * * *